United States Patent [19]
Verbueken et al.

[11] Patent Number: 6,045,696
[45] Date of Patent: Apr. 4, 2000

[54] PROCESS FOR THE PURIFICATION OF WASTE WATERS CONTAINING ORGANIC AND INORGANIC SULPHUR COMPOUNDS

[75] Inventors: Armand Verbueken, s'Gravenwezel; Domien Sluyts, Hoevenen; Werner Verhoeven, Kalmthout; Wilhelm Nehoda, Brasschaat, all of Belgium

[73] Assignee: Bayer AG, Germany

[21] Appl. No.: 09/118,202

[22] Filed: Jul. 17, 1998

[30] Foreign Application Priority Data

Jul. 25, 1997 [DE] Germany ............................ 197 32 074

[51] Int. Cl.$^7$ ...................................................... C02F 1/26
[52] U.S. Cl. .......................... 210/634; 210/909; 548/152; 548/166; 548/167; 548/177
[58] Field of Search ...................... 210/634, 638, 210/639, 511, 909; 548/166–168, 152, 177

[56] References Cited

U.S. PATENT DOCUMENTS

| | | | |
|---|---|---|---|
| 3,966,594 | 6/1976 | Ohkawa et al. | 210/21 |
| 4,127,454 | 11/1978 | Torii et al. | 204/72 |
| 4,751,301 | 6/1988 | Wüst | 548/168 |
| 4,762,931 | 8/1988 | Denecker et al. | 548/166 |
| 5,015,456 | 5/1991 | Verbueken et al. | 210/638 |
| 5,705,074 | 1/1998 | Brient | 210/634 |

FOREIGN PATENT DOCUMENTS

| | | |
|---|---|---|
| 0 396 790 | 11/1990 | European Pat. Off. . |
| 2 350 962 | 4/1974 | Germany . |
| 39 18 725 A1 | 12/1988 | Germany . |

OTHER PUBLICATIONS

"Recovery of Aromatic Sulfonic Acids from Aqueous Solutions", Lodaya, M.P. and Sharma, M.M., *Separ. Proc. Technol.* 6 (1985), pp. 34–39.

"Recovery of Low–Molecular Organic Compounds from Complex Aqueous Mixtures by Extraction", Schügerl, K. and Gegener, W., Chem. Ing. Techn. 61 (1989), No. 10, pp. 796–804.

*Primary Examiner*—Peter A. Hruskoci
*Attorney, Agent, or Firm*—Connolly Bove Lodge & Hutz

[57] ABSTRACT

This invention relates to a process for the purification of waste waters containing organic and, should the situation arise, inorganic sulphur compounds, which waste waters contain a proportion of mercaptobenzothiazole and/or derivatives thereof and, should the situation arise, a proportion of benzothiazole and/or derivatives thereof and/or mercaptobenzimidazole and/or derivatives thereof and, should the situation arise, thiosulphate, whereby the waste waters are treated with an extracting agent comprising salts of aliphatic amines and aliphatic and/or aromatic hydrocarbons.

3 Claims, No Drawings

PROCESS FOR THE PURIFICATION OF WASTE WATERS CONTAINING ORGANIC AND INORGANIC SULPHUR COMPOUNDS

This invention relates to a process for the purification of waste waters containing organic and, should the situation arise, inorganic sulphur compounds, which waste waters contain a proportion of mercaptobenzothiazole and/or derivatives thereof and, should the situation arise, a proportion of benzothiazole and/or derivatives thereof and/or mercaptobenzimidazole and/or derivatives thereof and, should the situation arise, thiosulphate.

The purification of waste waters by liquid extraction in order to remove nitrates is known, for example, from DE 2 350 962. Another known process is the separation of halogenated hydroxy aromatics, of phenols and of nitrohydroxy aromatics from aqueous solutions by means of extraction. The extracting agent used here is a salt of an aliphatic amine having a total carbon number of at least 10 and of a strong acid. The use of the amine salt has the advantage over the use of pure amine that the extractive action is considerably increased. Such processes are described, for example, in DE 3 718 725 and DE 3 436 349.

Also known (see EP 0 396 790) is a process for the removal of nitrate and/or organic impurities from waste waters by extraction with sulphates of aliphatic amines in the presence of organic solvents. The last-named process applies in particular to the purification of waste waters which arise during the production of caprolactam. The products which enter the waste water during the process contain a large proportion of compounds having ammonium sulphonate groups.

Furthermore, it is known that waste waters containing water-soluble organic substances of anionic character can be worked up by treatment with aromatic amines (U.S. Pat. No. 3,966,594). The recovery from complex aqueous mixtures of organic compounds of low molecular weight by extraction by means of aliphatic amines of high molecular weight is also known (Chem. Ing. Techn. 61 (1989) No. 10, pages 796–804). The recovery of aromatic sulphonic acids from aqueous solutions by means of extraction with higher amines, such as trioctylamine and dilaurylamine, in the presence of organic solvents is also known (J. Separ. Proc. Technol. 6 (1985), pages 34–39).

It can be deduced from the above-mentioned publications that the extraction with the aid of higher amines or of amine salts in the presence of organic solvents functions particularly effectively when either organic compounds having acidic groups, such as sulphonic acid groups and/or carboxyl groups, and having a low $pK_a$ value, or organic anionic compounds, such as sulphonated aromatic compounds, are being treated.

An object of the present invention therefore, was to remove the vast majority of organic and, should the situation arise, inorganic sulphur compounds from waste waters containing them, in order to improve considerably the biological waste-water treatment. In particular 2-mercaptobenzothiazoles, benzothiazoles and mercaptobenzimidazoles are toxic to bacteria and very greatly impair the decomposing action of biological waste treatment plants.

The present invention accordingly provides a process for the purification of waste waters which contain mercaptobenzothiazole and/or derivatives thereof and, should the situation arise, benzothiazole and/or derivatives thereof and/or mercaptobenzimidazole and/or derivatives thereof and thiosulphate, which is characterised in that the waste waters are treated with an extracting agent comprising salts of aliphatic amines having 8 to 50 carbon atoms and having a solubility of £10 ppm in water (20° C.) and aliphatic and/or aromatic hydrocarbons having a solubility of £10 ppm in water (20° C.), the molar ratio of aliphatic amines used to total sulphur compounds present in the waste water being from 1:10 to 10:1 and the aliphatic amines being used in quantities of from 1 to 60 wt. %, based on the total quantity of extracting agent.

Waste waters which can be purified by the process according to the invention originate in particular from the production of sulphur-containing organic compounds which are used, for example, as antioxidants or as vulcanisation accelerators in the processing of rubber. Waste waters arising during the production of sulphenamides based on 2-mercaptobenzothiazoles and derivatives thereof, such as disulphides and Zn salts, and on mercaptobenzimidazoles and derivatives thereof are particularly suitable for the purification according to the invention.

The waste waters which can be purified by the process according to the invention contain the organic and, should the situation arise, inorganic sulphur compounds in quantities of from 10 to 6,000 ppm and in particular from 1,000 to 3,500 ppm. Organic and inorganic sulphur compounds which may be mentioned particulary in this connection are: mercaptobenzothiazole and derivatives thereof, benzothiazole and derivatives thereof, mercaptobenzimidazole and derivatives thereof and thiosulphate.

The content of mercaptobenzothiazole and/or derivatives thereof, such as the sulphinates and corresponding hydroxyl compounds, is in general from 200 to 2,000 ppm.

The content of benzothiazole and/or derivatives thereof, such as the sulphinates and corresponding hydroxyl compounds, is in general from 100 to 2,000 ppm.

The content of mercaptobenzimidazole and/or derivatives thereof, such as the sulphinates and corresponding hydroxyl and alkyl compounds, is in general from about 10 to 2,000 ppm.

Besides mercaptobenzothiazole, benzothiazole and mercaptobenzimidazole, a certain proportion of the derivatives of these, such as the corresponding sulphinates and hydroxyl compounds, are also present, as mentioned above. These derivatives are formed during the production of the above-mentioned rubber additives. The content of the derivatives may be up to 1,000 wt. %, based on the total quantity of mercaptobenzothiazole or of benzothiazole or of mercaptobenzimidazole.

The inorganic sulphur compounds also present in the waste waters should the situation arise, such as thiosulphate, may occur in the waste waters in quantities of up to 50 wt. %, based on the total quantity of organic sulphur compounds.

In the process according to the invention, the waste waters described above are treated with an extracting agent consisting of salts, preferably the sulphates and chlorides, of aliphatic amines having preferably 18 to 36 carbon atoms. The aliphatic amines used here are in particular the tertiary aliphatic amines, such as tri-n-octylamine, triisooctylamine, tri-n-decylamine, triisodecylamine, tri-n-dodecylamine, triisododecylamine or mixtures thereof.

The solubility of the aliphatic amines used is preferably below 5 ppm and in particular below 1 ppm in water (20° C.).

Besides the salts of aliphatic amines, aliphatic and/or aromatic hydrocarbons having a solubility preferably of £5 ppm and in particular of £1 ppm in water (20° C.) are also used in the extraction. Aliphatic and/or aromatic hydrocarbons which are particularly suitable are dodecane and kerosines such as, for example, mixtures of >99.5% aromatic hydrocarbons having a boiling range of from 186 to 214° C. and a flash point of ≧65° C.

The molar ratio of aliphatic amines used to the sulphur compounds present in the waste water is preferably from 1:5 to 5:1 and in particular from 1:1 to 3:1.

The aliphatic amines are used in quantities preferably of from 5 to 40 wt. %, in particular from 10 to 30 wt. %, based on the total quantity of extracting agent.

The purification process according to the invention may be carried out both batchwise and continuously.

The process according to the invention is conventionally carried out at standard pressure. Naturally it is also possible to carry out the process according to the invention at a slightly increased or slightly reduced pressure.

The temperatures during the purification processes according to the invention are generally from 20 to 80° C., preferably from 30 to 60° C.

The process according to the invention also provides the working up of the extracting agent obtained during the purification. The working up is characterised in that the extracting agent containing the sulphur compounds is treated with an aqueous, inorganic base, then the aqueous phase now containing the sulphur compounds, after treatment with inorganic acids, is optionally worked up in order to recover sulphur or sulphur compounds and the organic phase, which consists of the extracting agent, is returned to the purification process or—if benzothiazole is additionally present in the waste waters—the organic phase, which after the treatment with bases consists of the extracting agent and of benzothiazole, is treated with at least 10 wt. % sulphuric acid, then the benzothiazole together with the aqueous sulphuric acid are led away for working up and the extracting agent partly freed from the benzothiazole is returned to the purification process and the returned extracting agent does not exceed a residual benzothiazole content of 15 wt. %.

The extracting agent, which now contains the organic and, should the situation arise, inorganic sulphur compounds, is then treated with an aqueous, inorganic base. The conventional alkali metal and alkaline-earth metal hydroxides and oxides, as well as ammonia, may be used as inorganic bases; sodium hydroxide solution is preferred. The inorganic bases may be used singly or mixed with one another. The concentration of the inorganic bases in water is generally from 5 to 50 wt. % and preferably from 10 to 20 wt. %. The quantity of aqueous, inorganic bases is generally from 5 to 20 wt. %, based on the extracting agent.

After the extracting agent containing the organic and, should the situation arise, inorganic sulphur compounds has been treated with aqueous, inorganic bases, the aqueous phase thus obtained, which now contains the organic and, should the situation arise, inorganic sulphur compounds, is worked up with inorganic acids, such as sulphuric acid, in order to recover sulphur or sulphur compounds. During the acidification with inorganic acids, the organic and, should the situation arise, inorganic sulphur compounds are precipitated in the form of a resin which, as mentioned, can be worked up into sulphur or sulphur compounds.

The organic phase obtained, consisting substantially of the extracting agent described above, can be returned to the purification process.

If in addition benzothiazole is present in the waste waters, the organic phase, which after the treatment with aqueous, inorganic bases consists of the extracting agent and of benzothiazole, is treated with at least 10 wt. % sulphuric acid, preferably with at least 20 wt. % sulphuric acid and in particular with at least 30 wt. % sulphuric acid. The quantity of sulphuric acid is thus preferably from 10 to 80 wt. %, based on the organic phase.

Subsequently the benzothiazole together with the aqueous sulphuric acid are led away for working up and the extracting agent partly freed from the benzothiazole is returned to the purification process. During the process of working up the returned extracting agent, care should be taken to ensure that the returned extracting agent does not exceed a residual benzothiazole content of preferably 10 wt. % and in particular 5 wt. %. This means, in other words, that the content of benzothiazole in the extracting agent does not exceed a given value.

The purification process according to the invention can be carried out in conventional apparatus, such as extraction columns or mixer-settler units.

The process according to the invention is distinguished in particular by the feature that a surprisingly high proportion of the organic and, should the situation arise, inorganic sulphur compounds can be removed from the waste waters. The proportion can be up to 100%. It is also of significance in the process according to the invention that the organic and, should the situation arise, inorganic sulphur compounds can be separated off to such a large extent despite the presence of inorganic salts, such as sulphates or chlorides. Because of this, the process according to the invention proves to be particularly economic.

On the basis of the prior art described above, it was surprising that the mercaptobenzothiazoles, benzothiazoles and mercaptobenzimidazoles can, as mentioned, be separated off virtually quantitatively in the process according to the invention, although these compounds contain no acidic groups and have a $pK_a$ value of above 7. That is to say, it would inevitably be expected that only those organic compounds having a particularly low $pK_a$ value and an anionic character can be extracted particularly with the aid of amine compounds.

EXAMPLES

Example 1

1,000 ml of waste water obtained from the production of vulcanisation accelerators and having a pH value of 3.4 was treated once with 100 ml of an extracting agent comprising 10 wt. % tri-n-octylamine and 90 wt. % kerosine. The amine was reacted beforehand with sulphuric acid to form the amine sulphate salt. The waste water used contained 375 mg/l 2-mercaptobenzothiazole (MBT), 310 mg/l benzothiazole (BT) and 2125 mg/l of derivatives thereof. The molar ratio of amine used to sulphur compounds present in the waste water was 2:1. After the phase separation, the extracted aqueous phase still contained <5 mg/l MBT, 18 mg/l BT and 800 mg/l of derivatives. This corresponds to a degree of extraction of almost 100% for 2-mercaptobenzothiazole and 94% for benzothiazole.

Example 2

In a two-stage mixer-settler extraction unit, 5 l/h of waste water obtained from the production of rubber auxiliaries was extracted continuously and in countercurrent using an extracting agent comprising 10 wt. % tri-n-octylamine and 90 wt. % kerosine, in the course of which the molar ratio of amine used to sulphur compounds present in the waste water was 2:1. The amine was reacted beforehand with sulphuric acid to form the amine sulphate salt. The waste water used contained 260 mg/l 2-mercaptobenzothiazole (MBT), 215 mg/l benzothiazole (BT), 220 mg/l 2-mercaptomethylbenzimidazole (MB2) and 1885 mg/l of derivatives thereof. The extracted waste water still contained <10 mg/l MBT, <10 mg/l BT, <10 mg/l MB2 and 400 mg/l of derivatives. This corresponds to a complete extraction of 2-mercaptobenzothiazole, benzothiazole and 2-mercaptomethylbenzimidazole.

Example 3

In a two-stage mixer-settler extraction unit, 85 kg/h of waste water obtained from the production of rubber auxiliaries was extracted continuously and in countercurrent using 4.5 kg/h of an extracting agent comprising 20 wt. % triisooctylamine and 80 wt. % kerosine, in the course of which the amine was converted into the amine sulphate salt by addition of sulphuric acid (50 wt. %). In addition to 3 wt. % NaCl, 3 wt. % $Na_2SO_4$ and 140 mg/l of residual amounts of amines used in the production, the waste water used also contained 400 mg/l 2-mercaptobenzothiazole, 300 mg/l benzothiazole, 40 mg/l 2-mercaptomethylbenzimidazole, 500 mg/l thiosulphate and 1550 mg/l of derivatives.

The extracted waste water still contained <5 mg/l 2-mercaptobenzothiazole, 30 mg/l benzothiazole, <5 mg/l 2-mercaptomethylbenzimidazole, 25 mg/l thiosulphate and 280 mg/l of derivatives. The residual amines were not extracted. The salt content remained almost unaltered: 2.8 wt. % NaCl and 3.2 wt. % $Na_2SO_4$.

In a re-extraction step, the extracting agent (4.6 kg/h) containing the sulphur compounds was then treated with 0.5 kg/h of 18 wt. % sodium hydroxide solution in a mixer-settler unit. The aqueous phase now containing the sulphur compounds, after having been acidified with sulphuric acid, was converted into a resin and further worked up in order to recover the sulphur.

The organic phase, which after the treatment with base consists of the extracting agent and of 2.9 wt. % benzothiazole, was treated in a separate mixer-settler unit with circulating 32 wt. % sulphuric acid (3.7 kg/h). At the same time, 0.5 kg/h of 50 wt. % sulphuric acid was added continuously.

The extracting agent (4.5 kg/h) thus partly freed from the benzothiazole was returned to the purification process, as mentioned above.

What is claimed is:

1. A process for the purification of waste waters containing contaminants selected from the group consisting of mercaptobenzothiazole, thiosulphate, benzothiazole, mercaptobenzimidazole and derivatives thereof, including the steps of treating the waste waters with an extracting agent comprising salts of aliphatic amines having 8 to 50 carbon atoms and having a solubility of up to 10 ppm in water (20° C.) and aliphatic and/or aromatic hydrocarbons having a solubility of up to 10 ppm in water (20° C.), the molar ratio of aliphatic amines used to total sulphur compounds present in the waste water being from 1:10 to 10:1 and the aliphatic amines being used in quantities of from 1 to 60 wt. %, based on the total quantity of extracting agent, and separating said extracting agent from the waste water.

2. A process according to claim 1, wherein the separating extracting agent with sulphur compounds therein is treated with an aqueous, inorganic base, then an aqueous phase now containing the sulphur compounds, after treatment with inorganic acids, is optionally worked up in order to recover sulphur or sulphur compounds and an organic phase, which consists of the extracting agent, is returned to the process.

3. A process according to claim 1, wherein the waste waters contain benzothiazole, and after treatment with an aqueous, inorganic base, an organic phase consisting of the extracting agent and of benzothiazole, is treated with at least 10 wt. % sulphuric acid, then the benzothiazole together with the aqueous sulphuric acid are led away for working up and the extracting agent partly freed from the benzothiazole is returned to the process and the returned extracting agent does not exceed a residual benzothiazole content of 15 wt. %.

* * * * *